US012387002B2

(12) United States Patent
Wright et al.

(10) Patent No.: US 12,387,002 B2
(45) Date of Patent: Aug. 12, 2025

(54) SECURE IN-MEMORY UNITS FOR TRANSMITTING AND RECEIVING ENCODED VECTORS FOR EXTERNAL SECURE SIMILARITY SEARCHES

(71) Applicant: GSI Technology Inc., Sunnyvale, CA (US)

(72) Inventors: Mark Wright, Cupertino, CA (US); Avidan Akerib, Tel Aviv (IL)

(73) Assignee: GSI Technology Inc., Sunnyvale, CA (US)

( * ) Notice: Subject to any disclaimer, the term of this patent is extended or adjusted under 35 U.S.C. 154(b) by 296 days.

(21) Appl. No.: 17/315,309

(22) Filed: May 9, 2021

(65) Prior Publication Data

US 2021/0357515 A1 Nov. 18, 2021

Related U.S. Application Data

(60) Provisional application No. 63/184,824, filed on May 6, 2021, provisional application No. 63/026,155, filed on May 18, 2020.

(51) Int. Cl.
  *G06F 21/62* (2013.01)
  *G06F 18/214* (2023.01)
  (Continued)

(52) U.S. Cl.
  CPC ........ *G06F 21/6254* (2013.01); *G06F 18/214* (2023.01); *G06F 18/22* (2023.01);
  (Continued)

(58) Field of Classification Search
  CPC .... G06F 21/6254; G06F 18/214; G06F 18/22; G06F 21/602; G06F 21/72; G06F 21/79;
  (Continued)

(56) References Cited

U.S. PATENT DOCUMENTS 7,395,435 B2 * 7/2008 Benhammou ......... H04L 9/0643
  713/168
8,510,236 B1 * 8/2013 Kumar .................. H04L 9/3236
  706/12
(Continued)

FOREIGN PATENT DOCUMENTS

CN    1889432 A  *  1/2007  ............. G06F 21/34
CN  101438316 A  *  5/2009  ............. G06F 21/00
(Continued)

OTHER PUBLICATIONS

Kaitlyn Lee, Evaluating Accelerators for a High-Throughput Hash-Based Security Protocol', ICPP Workshops '23: Proceedings of the 52nd International Conference on Parallel Processing Workshops Aug. 2023, 10 Pages https://doi.org/10.1145/3605731.3605745 (Year: 2023).*

(Continued)

*Primary Examiner* — Shahriar Zarrineh
(74) *Attorney, Agent, or Firm* — Heidi Brun Associates; Heidi M. Brun

(57) ABSTRACT

A system including a secure, in-memory unit implemented on an associative processing unit (APU), for creating encrypted vectors. The in-memory unit includes a data store and an encryptor. The data store stores data and the encryptor encrypts the data into an encrypted vector. Optionally, the unit includes a neural proxy hash encoder that encodes the data into an encoded vector, and, in this embodiment, the encryptor encrypts the encoded vector into an encrypted encoded vector. The neural proxy hash encoder includes a trained neural network which includes a plurality of layers that encode the data into feature sets. The trained neural network encodes image files, audio files, or large data sets. The APU is implemented on SRAM, non-volatile, or non-destructive memory.

5 Claims, 9 Drawing Sheets

(51) Int. Cl.

| | |
|---|---|
| *G06F 18/22* | (2023.01) |
| *G06F 21/60* | (2013.01) |
| *G06F 21/72* | (2013.01) |
| *G06F 21/79* | (2013.01) |
| *G06N 3/04* | (2023.01) |
| *G06V 10/764* | (2022.01) |

(52) U.S. Cl.
CPC ............ *G06F 21/602* (2013.01); *G06F 21/72* (2013.01); *G06F 21/79* (2013.01); *G06N 3/04* (2013.01); *G06V 10/764* (2022.01)

(58) Field of Classification Search
CPC ........ G06F 16/953; G06N 3/04; G06N 3/063; G06N 3/08; G06V 10/764
See application file for complete search history.

(56) References Cited

U.S. PATENT DOCUMENTS

| | | | | |
|---|---|---|---|---|
| 9,098,569 | B1* | 8/2015 | Bhagat | G06F 16/9535 |
| 10,929,751 | B2 | 2/2021 | Ehrman | |
| 2002/0053002 | A1* | 5/2002 | Brandin | G06F 16/90339 707/E17.034 |
| 2006/0161445 | A1* | 7/2006 | Frank | G06F 21/44 726/17 |
| 2008/0065547 | A1* | 3/2008 | Shimizu | G06F 21/72 705/51 |
| 2011/0173452 | A1* | 7/2011 | Nan | H04L 9/3073 380/279 |
| 2012/0331308 | A1* | 12/2012 | Fernandez Gutierrez | G06F 21/71 713/190 |
| 2014/0229339 | A1* | 8/2014 | Massiere | G06Q 20/40 705/26.81 |
| 2014/0330726 | A1* | 11/2014 | Ball | G06F 21/34 713/184 |
| 2018/0011802 | A1* | 1/2018 | Ndu | G06F 21/602 |
| 2018/0253496 | A1* | 9/2018 | Natchu | G06F 16/951 |
| 2018/0341642 | A1* | 11/2018 | Akerib | G06N 3/044 |
| 2019/0229925 | A1* | 7/2019 | Kounavis | G06F 11/2094 |
| 2020/0159871 | A1* | 5/2020 | Bowen | G06T 11/60 |
| 2020/0265045 | A1* | 8/2020 | Tepper | G06F 16/2462 |
| 2020/0265098 | A1* | 8/2020 | Tepper | G06F 18/22 |
| 2020/0286112 | A1* | 9/2020 | Zhou | G06N 3/084 |
| 2021/0090348 | A1* | 3/2021 | Croxford | G06V 10/82 |
| 2021/0224267 | A1* | 7/2021 | Dongaonkar | G06F 16/221 |
| 2021/0342700 | A1* | 11/2021 | Antic | G06N 3/08 |
| 2021/0357741 | A1* | 11/2021 | Jha | H04W 84/18 |

FOREIGN PATENT DOCUMENTS

| | | | | |
|---|---|---|---|---|
| CN | 101847271 A | * | 9/2010 | |
| CN | 106886785 A | * | 6/2017 | .......... G06K 9/4671 |
| CN | 103986571 B | * | 4/2018 | |
| CN | 108260119 A | * | 7/2018 | ............ H04W 12/06 |
| CN | 109284411 A | * | 1/2019 | ............. G06F 18/22 |
| CN | 109657112 A | * | 4/2019 | ............. G06K 9/6215 |
| CN | 110188219 A | * | 8/2019 | ............. G06F 16/53 |
| CN | 110555719 A | * | 12/2019 | .......... G06K 9/6215 |
| CN | 110659375 A | * | 1/2020 | |
| CN | 112149151 A | * | 12/2020 | ........ G06F 12/1027 |
| CN | 109376797 B | * | 5/2023 | ........... G06K 9/6256 |
| CN | 111695917 B | * | 10/2024 | ........... G06F 18/22 |
| DE | 102015001801 A1 | * | 8/2016 | .......... G06F 21/575 |
| EP | 3252642 B1 | * | 4/2023 | ............. G06F 21/32 |
| KR | 20190010245 A | * | 1/2019 | |
| WO | WO-0153915 A1 | * | 7/2001 | ............. G06F 21/34 |
| WO | WO-2017140248 A1 | * | 8/2017 | ............. G06F 17/16 |
| WO | WO-2018076671 A1 | * | 5/2018 | |
| WO | WO-2021036070 A1 | * | 3/2021 | ........ G06F 16/2255 |
| WO | 2021260612 | | 12/2021 | |

OTHER PUBLICATIONS

J Wang, "Hashing for Similarity Search: A Survey", Subjects: Data Structures and Algorithms (cs.DS); Computer Vision and Pattern Recognition (cs.CV); Databases (cs.DB) Cite as: arXiv:1408.2927 [cs.DS] (or arXiv:1408.2927v1 [cs.DS] for this version), [Submitted on Aug. 13, 2014], 29 pages (Year: 2014).*

Mehmet Kuzu, "Efficient Similarity Search over Encrypted Data", Published in: 2012 IEEE 28th International Conference on Data Engineering, Date of Conference: Apr. 1-5, 2012, Date Added to IEEE Xplore: Jul. 2, 2012, 12 pages (Year: 2012).*

* cited by examiner

SECURE IN-MEMORY UNITS FOR TRANSMITTING AND RECEIVING ENCODED VECTORS FOR EXTERNAL SECURE SIMILARITY SEARCHES

CROSS REFERENCE TO RELATED APPLICATIONS

This application claims priority from U.S. provisional patent application 63/026,155 filed May 18, 2020 and US provisional patent application 63/184,824 filed May 6, 2021, which are incorporated herein by reference.

FIELD OF THE INVENTION

The present invention relates to similarity search generally and to sensitive data in particular.

BACKGROUND OF THE INVENTION

Users often need to transfer sensitive data between their computing device and a third-party system for processing, without compromising the security of the transmitted data. Such sensitive data could be for example: private, personal, system critical or business confidential data. Some examples of such sensitive data transfers are: a patient needs to supply medical images or a medical history to a doctor or hospital; an autonomous control system needs to transfer files from sensors to a remote processing system; and, an investor needs to transfer proof of assets to a financial institution. It is essential that such data transfers remain secure and private.

Sometimes, sensitive information is transmitted across the internet from a personal computing device, for example a computer or mobile phone, to a remote server where it is stored. Data transfers may also occur over a private network or via a device like a USB thumb drive. Once the data is on the server, system processors access and retrieve it for processing.

Reference is now made to FIG. 1 which illustrates how sensitive data is transferred between a user device and a processing system, the illustration shows a user computing device 10 that has a CPU 12 connected to data storage 14 via a data bus 15. The computing device can transfer sensitive data from data storage 14 across data bus 15 and encrypt it using software on CPU 12. Sensitive data is encrypted using known methods, such as a secure hash algorithm (SHA) or other shared-key algorithms such as MD5.

Encrypted data packets are then transferred across network 16. Network 16 can be implemented in a number of ways such as: a 'sneaker-net' 17, where data is placed on a physical device like a USB thumb-drive and brought by a person to a receiving server; a private or public wireline network 19; a private or public wireless network 20; or a cloud network 21, which may contain a cloud-based server 22.

Processing system 25 has a CPU 27, a memory 26, and a data bus 32. A local server 33 is connected to processing system 25 by data bus 24 and/or a cloud server 22 is connected to CPU 27 via a network connection 29. Data buses may be internal to processors, local connections or network connections.

The encrypted data packet traverses network 16 to where it will be stored either on cloud-server 22 or a local server 33 which is locally attached to a processing system 25. Processing system 25 has a CPU 27 that performs processing, local memory 26 to store a local copy of data for processing, and an attached server as described hereinabove. CPU 27 retrieves the encrypted data from local server 33 or cloud server 22 and decrypts it, and then performs whatever operation is required, such as a search. Any output will be encrypted before being written to the server.

SUMMARY OF THE PRESENT INVENTION

There is provided, in accordance with a preferred embodiment of the present invention, a system including a secure, in-memory unit implemented on an associative processing unit (APU), for creating encrypted vectors. The in-memory unit includes a data store, and an encryptor. The data store stores data, and the encryptor encrypts the data into an encrypted vector.

There is provided, in accordance with a preferred embodiment of the present invention, a system including a secure, in-memory unit implemented on an associative processing unit (APU), for performing a secure similarity search. The in-memory unit includes a decryptor, an encoded vector data store, and a similarity searcher. The decryptor decrypts an encrypted, encoded vector into an encoded vector. The encoded vector data store stores a plurality of encoded search candidate vectors, and the similarity searcher performs a similarity search between an encoded search query vector and the plurality of encoded search candidate vectors.

There is provided, in accordance with a preferred embodiment of the present invention, a system including a secure, in-memory unit implemented on an associative processing unit (APU), for performing a secure similarity search. The in-memory unit includes a decryptor, a neural proxy hash encoder, an encoded vector data store, and a similarity searcher. The decryptor decrypts an encrypted data vector into a data vector, and the neural proxy hash encoder encodes the data vector into an encoded search data vector. The encoded vector data store stores a plurality of encoded search candidate vectors, and the similarity searcher performs a similarity search between an encoded search query vector and the plurality of encoded search candidate vectors.

There is provided, in accordance with a preferred embodiment of the present invention, a system including a secure, in-memory unit implemented on an associative processing unit (APU), for secure data transfer. The in-memory unit includes a decryptor and an encoded vector data store. The decryptor decrypts an encrypted data vector into a data vector, and the encoded vector data store stores a plurality of data vectors.

Moreover, in accordance with a preferred embodiment of the present invention, the system also includes a neural proxy hash encoder and the encryptor. The neural proxy hash encoder encodes the data into an encoded vector, and the encryptor encrypts the encoded vector into an encrypted encoded vector.

Additionally, in accordance with a preferred embodiment of the present invention, the neural proxy hash encoder includes a trained neural network, including a plurality of layers, that encodes the data into feature sets.

Further, in accordance with a preferred embodiment of the present invention, the trained neural network encodes at least one of: image files, audio files or large data sets.

Still further, in accordance with a preferred embodiment of the present invention, the APU is implemented on SRAM, non-volatile or non-destructive memory.

Moreover, in accordance with a preferred embodiment of the present invention, the encoded vector is an encoded search query vector or an encoded search candidate vector.

Further, in accordance with a preferred embodiment of the present invention, the vector data store stores the encoded search candidate vectors in columns.

Still further, in accordance with a preferred embodiment of the present invention, the similarity searcher performs the similarity search of the plurality of encoded search candidate vectors in the columns in a parallel process.

Additionally, in accordance with a preferred embodiment of the present invention, the similarity search is a nearest neighbor search.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
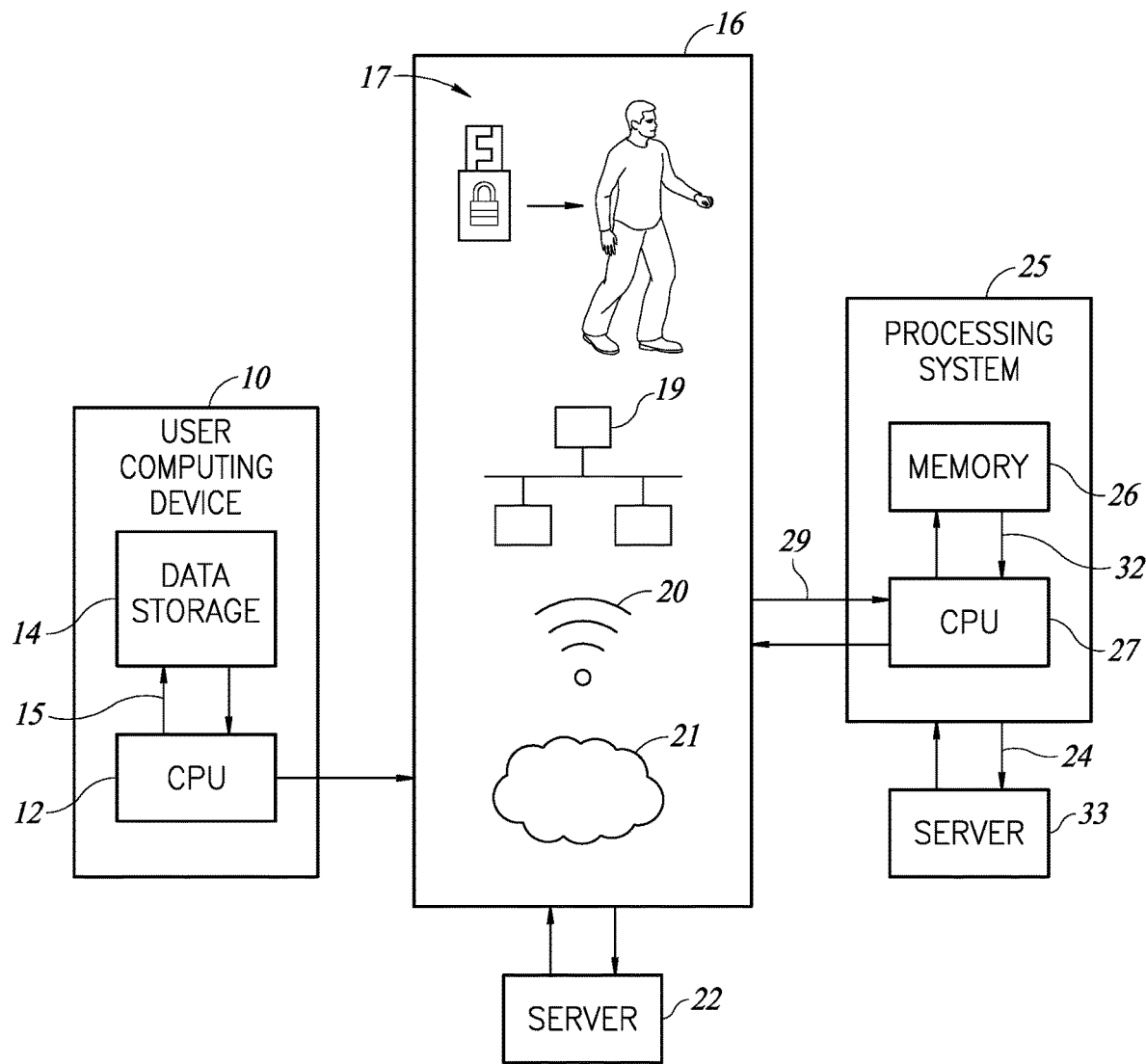
FIG. 1 is an illustration of a prior art system to transfer sensitive data between a user device and a processing system.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Applicant has realized that as data moves within systems across data buses, and as data packets move across networks, an interception device known as a 'sniffer' may be used to intercept such a sensitive data packet or steal encryption keys. Such a sniffer may be a hardware or software device placed by a bad actor. Once data has been intercepted, the data payload may then be attacked and if decrypted, its security compromised.

Applicant has realized that in-memory neural network encoding, in-memory encrypting and decrypting, and in-memory storage of encoded data, may be performed on an associative processing unit (APU), which may be implemented on any suitable type of memory array, such as SRAM, non-volatile, or non-destructive types of memory arrays. An example of such an APU is the Gemini APU, commercially available from GSI Technology Inc. Such associative memory devices may deny access to sniffers in user and processing systems, as well as increase the security of data packets transmitted across networks. Applicant has also realized that such APU devices may be easily embedded in user and processing systems.

Figure 2A:
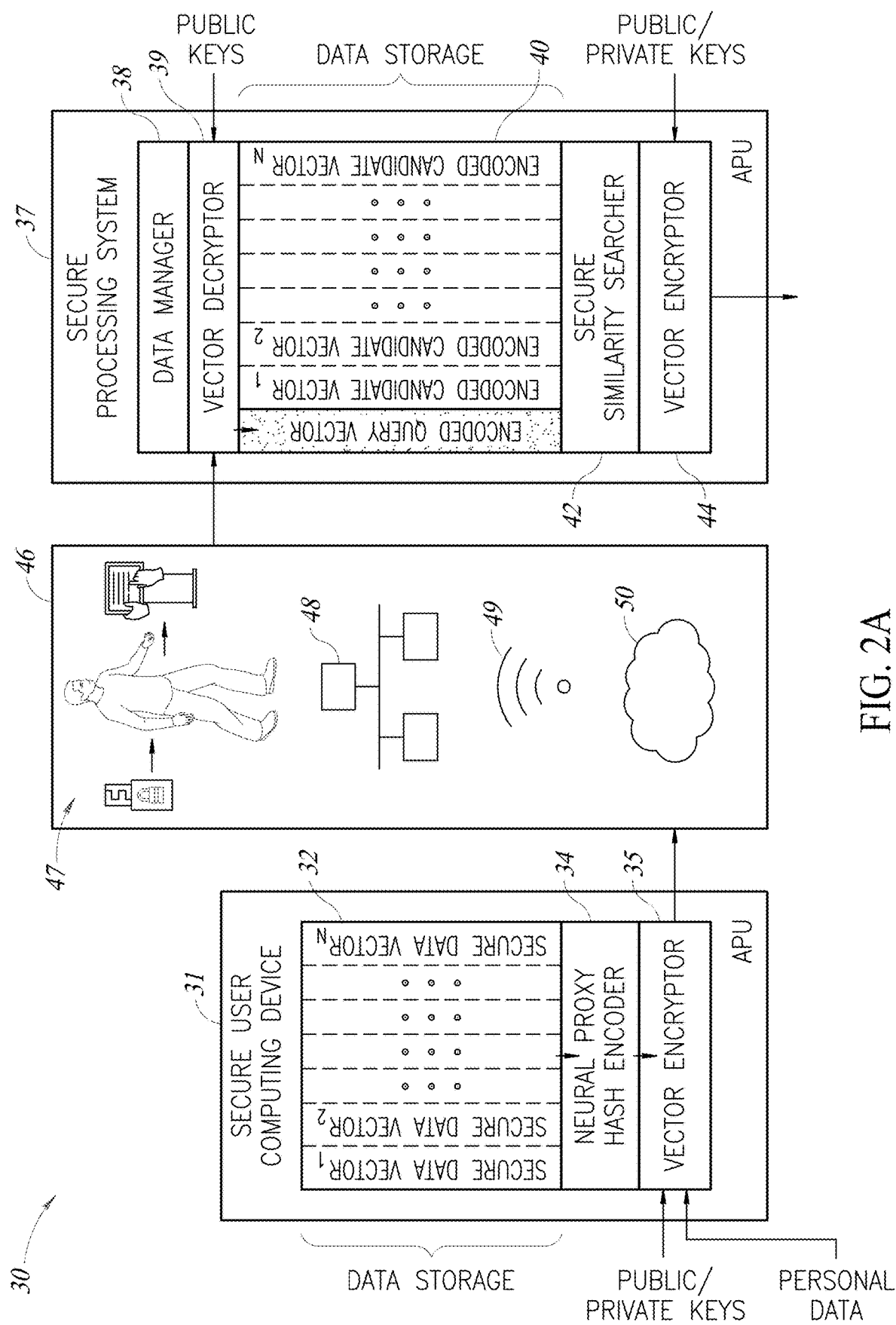
FIG. 2A is an illustration of an encoded, encrypted, search vector system.
Figure 2B:
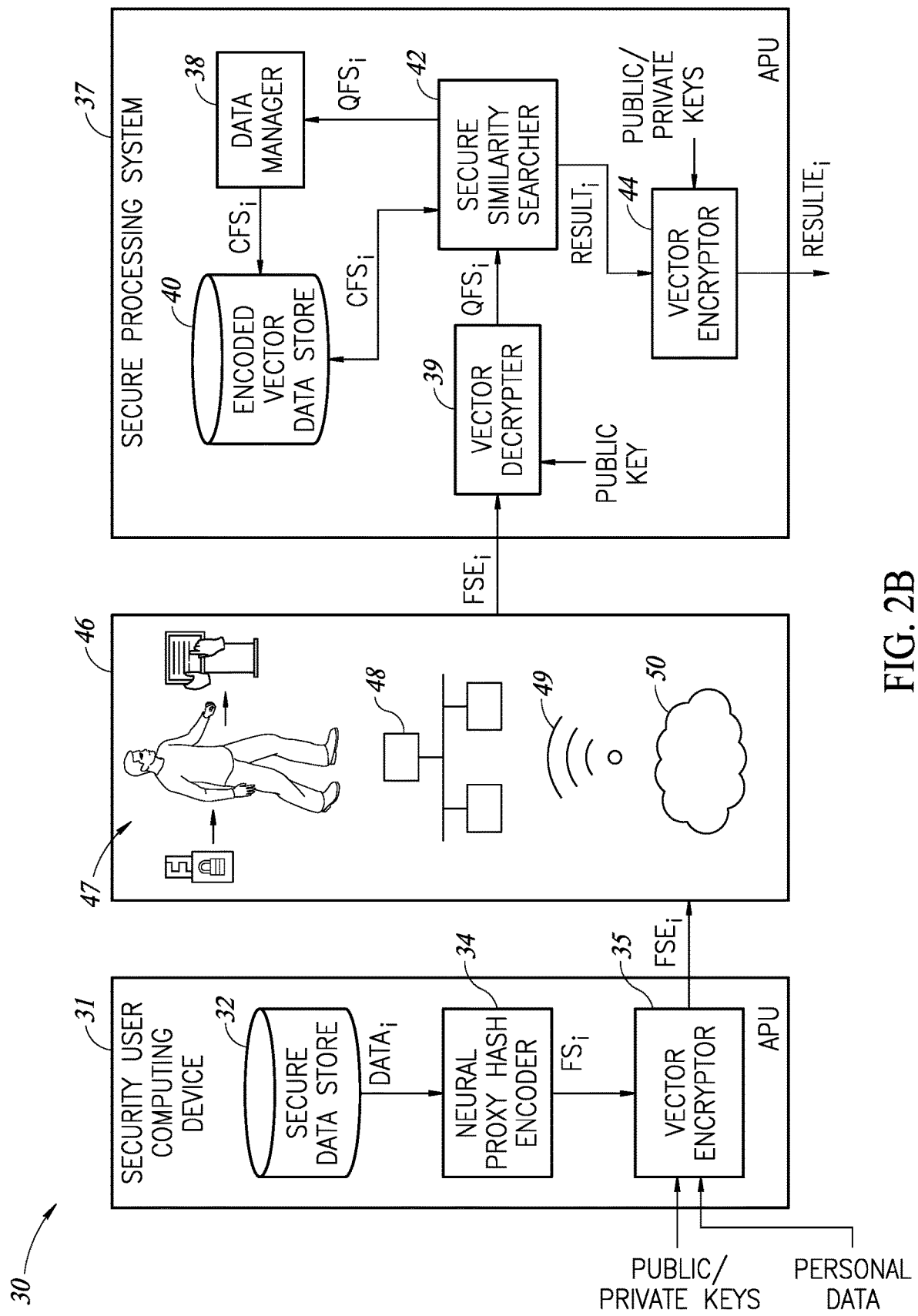
FIG. 2B is an illustration of the data flow in the encoded, encrypted, search vector system of FIG. 2A.

Reference is made to FIG. 2A which illustrates a preferred embodiment of the present invention, an encoded, encrypted, search vector system 30, and to FIG. 2B which illustrates the data flow in system 30. Encoded, encrypted, search vector system 30 comprises a secure user computing device 31 and a secure processing system 37, connected together across a network 46. Secure user computing device 31 and secure processing system 37 are each implemented on an APU such as the one mentioned hereinabove.

User computing device 31 comprises a data store 32, a neural proxy hash encoder 34, and a vector encryptor 35. A secure data vector, $data_i$, which is unencoded and unencrypted raw data that is stored in data store 32, may be encoded into feature sets, $fs_i$, by neural proxy hash encoder 34.

An example of such a neural proxy hash encoder 34, which is based on binary hashing, and maps data points in the original representation space into binary codes in the hamming space, is described in detail in US provisional patent application 63/043,215, entitled "Hamming Space Locality Preserving Neural Hashing For Similarity Search" and filed Jun. 24, 2020, which was converted to U.S. application Ser. No. 17/795,233 on Jun. 24, 2021, entitled "NEURAL HASHING FOR SIMILARITY SEARCH" and issued as U.S. Pat. No. 11,763,136, on Sep. 19, 2023, commonly owned by the Applicant of the present invention and which is incorporated herein by reference.

A neural proxy hash encoder is a neural network (NN) that is trained to encode data files into binary encoded feature sets. Feature sets are data representations of specific characteristics of the data to be encoded. For example, if the feature of interest in a dataset of human characteristics is the height or weight of a person, the NN will be trained to extract and encode height and weight from data that is input to the NN. Neural networks are trained by calibrating a plurality of 'layers,' using a set of training data that has known content and feature labels. A NN is considered trained when it reliably extracts the features from the known data sets. NNs may also be trained to recognize features in data sets, images and sounds files. Such large and highly complex data may be reduced to a set of known features, which is a set of binary data, known as a feature set. Applicant has realized that the feature sets are, effectively, an encoding of the complex data and thus, may be used as an encoder.

Encoded data vector $fs_i$, may then be encrypted into an encoded and encrypted vector $fse_i$, by encryptor 35 using public and private keys of the sender and the public key of the receiver and adding any additional personal data such as name and age. Vector $fse_i$ may then be transmitted across network 46 to processing system 37.

Network 46, similarly to network 16 in FIG. 1, may be implemented in a number of ways, such as: a 'sneaker-net' 47, where secure user computing device 31 places the encoded and encrypted data onto a physical device, like a USB thumb-drive, and a user may bring the drive to a computer or a 'kiosk' containing a secure processing system, for example in a hospital or doctor's office; a private or public wireline network 48; a private or public wireless network 49; or a cloud network 50.

Secure processing system 37 comprises a data manager 38, a vector decryptor 39, an encoded vector data store 40, a secure similarity searcher 42, and a vector encryptor 44.

Data store 40 may store encoded search candidate vectors, $cfs_i$, in its columns, where candidate vectors $cfs_i$ may also have been previously encoded by another version of neural proxy hash encoder 34.

Encrypted NN encoded vector $fse_i$, such as those produced by secure user computing device 31, may be decrypted by vector decryptor 39. Decryptor 39 may then provide the resulting NN encoded vector $fs_i$ as an encoded search query vector $qfs_i$ to secure similarity searcher 42 which, in turn, may search for similar vectors among NN encoded search candidate vectors cfs in columns of data store 40.

The results of the similarity search, a vector $result_i$, may then be encrypted by encryptor 44 into an encrypted vector, $resulte_i$, before being stored or transmitted off the APU. Data manager 38 may then delete encoded query vector $qfs_i$, or may add it to data store 40 as a candidate vector $cfs_i$ for use in future searches.

It should be noted that a binary encoded vector may be used as a query vector in a similarity search against a data store of candidate encoded vectors, that have previously been similarly encoded, as described in U.S. Pat. No. 10,929,751, entitled "Finding K Extreme Values In Constant Processing Time," dated Feb. 23, 2021, and U.S. patent application Ser. No. 16/033,259, entitled "Natural Language Processing With KNN," filed Jul. 12, 2018 and published as U.S. publication 2018/0341642 on Nov. 29, 2018, which are both commonly owned by the Applicant of the present invention and which are incorporated herein by reference.

It will be appreciated that similarity searches between encoded binary query vectors and a large plurality of encoded binary candidate vectors are suited to in memory, massive parallel processing, performed on APUs, with a complexity of O(1). Such a similarity search requires only encoded feature sets to be utilized during such similarity searches. It will also be appreciated that similarity searches utilizing encoded feature sets are less complex than similarity searches performed using complex data, such as large data sets, images and sound files.

It should be noted that all processing in a secure similarity search is performed only utilizing encoded vectors, and, as Applicant has realized, the encoded vectors contain only data that is convolved into a non-recoverable representation of the original raw data. It will be appreciated that, even if the security of secure processing system 37 is compromised, encoded data is secure in and of itself. So, a bad actor gaining access to such a secure system would only gain access to encoded feature sets, but would not gain access to original data sets, images and sounds files.

It should be noted that an encoded similarity search requires only encoded feature sets to be transmitted and utilized during such similarity searches. It will be appreciated that by only transmitting encoded vectors, the size of the transmitted file may be reduced. Functions such as image search require increased fixed and mobile bandwidth. Compared to raw image data, a NN encoded vector may achieve compression levels in excess of 50,000:1. For example, a 1-megapixel image may be represented by 16 million bits, whereas a NN encoded vector of such a 1-megapixel image may be represented by only 256 bits. Such compression levels may reduce the bandwidth requirement of image-based searches by the same amount. It will be appreciated that bandwidth reduction also translates into reduced physical memory requirements. Users who may use a thumb drive, or similar portable memory device, may need far less memory on such devices when using NN encoded vectors. As original file sizes increase, such as for higher fidelity sound or higher resolution images, feature set encoding represents even higher reduction in transmission bandwidth requirements, as well as a reduction in transmission duration.

It should be noted that sniffers may be present in user devices and processing systems and may be able to intercept data packets on data buses. As hardware and software sniffers may be attached throughout wireless or wireline networks, sniffers may be able to intercept data packets anywhere in the data transmission path.

It should be noted that every read/write operation between a processor and a server needs to be encrypted/decrypted. This requires encryption and decryption of every data block retrieved from or written to the server. It will be appreciated that by storing and processing data on an APU, the need for encryption/decryption for every memory retrieve/write operation is reduced to a single instance of writing to the APU memory from a server, or transferring data off the APU to a server. This may reduce system complexity and data processing duration.

Applicant has realized that just like an encrypted, encoded search vector can be sent securely between a user and processing system, candidate vectors on which searches may be performed may also be sent securely.

Figure 3A:
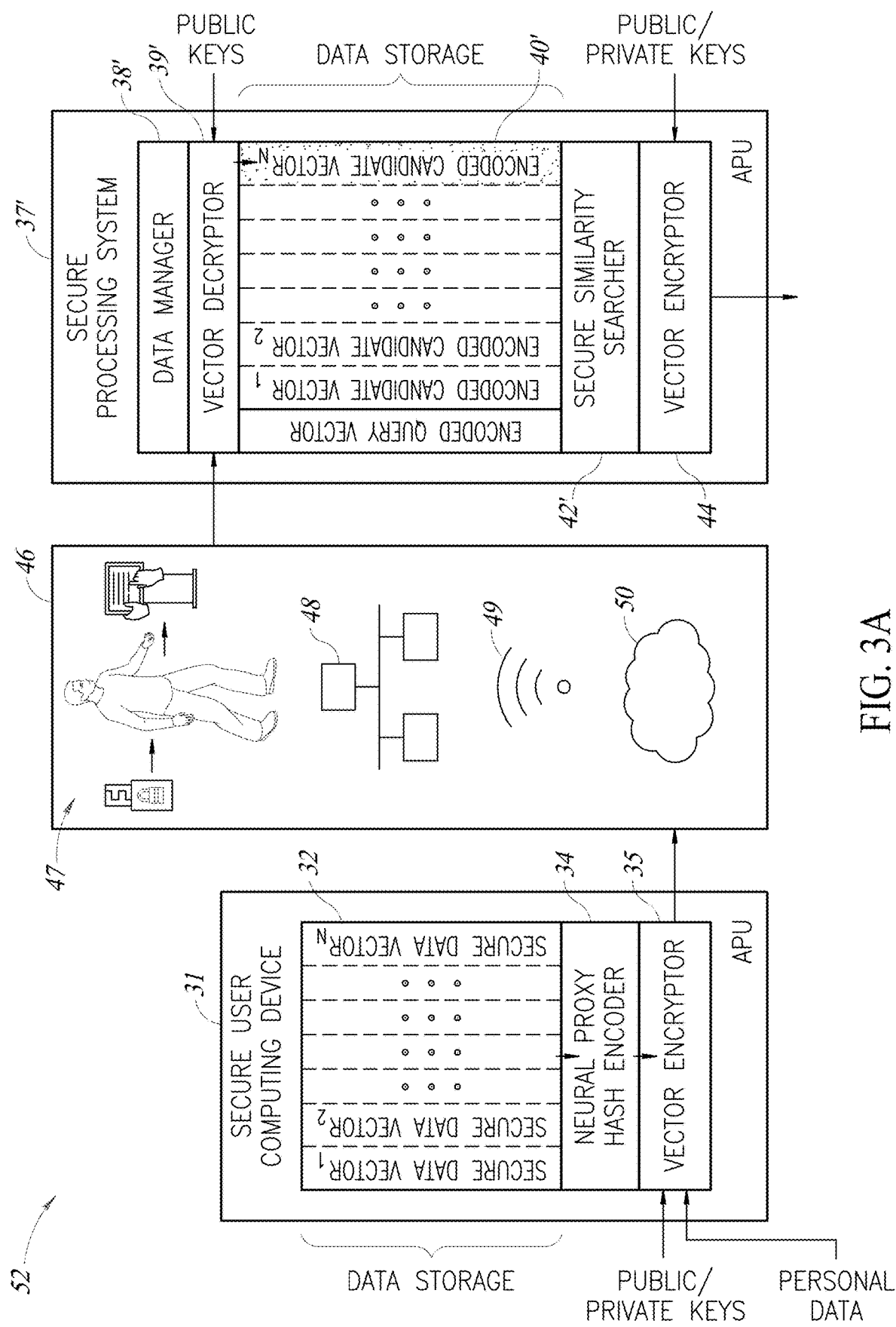
FIG. 3A is an illustration of an encoded, encrypted, candidate vector system.
Figure 3B:
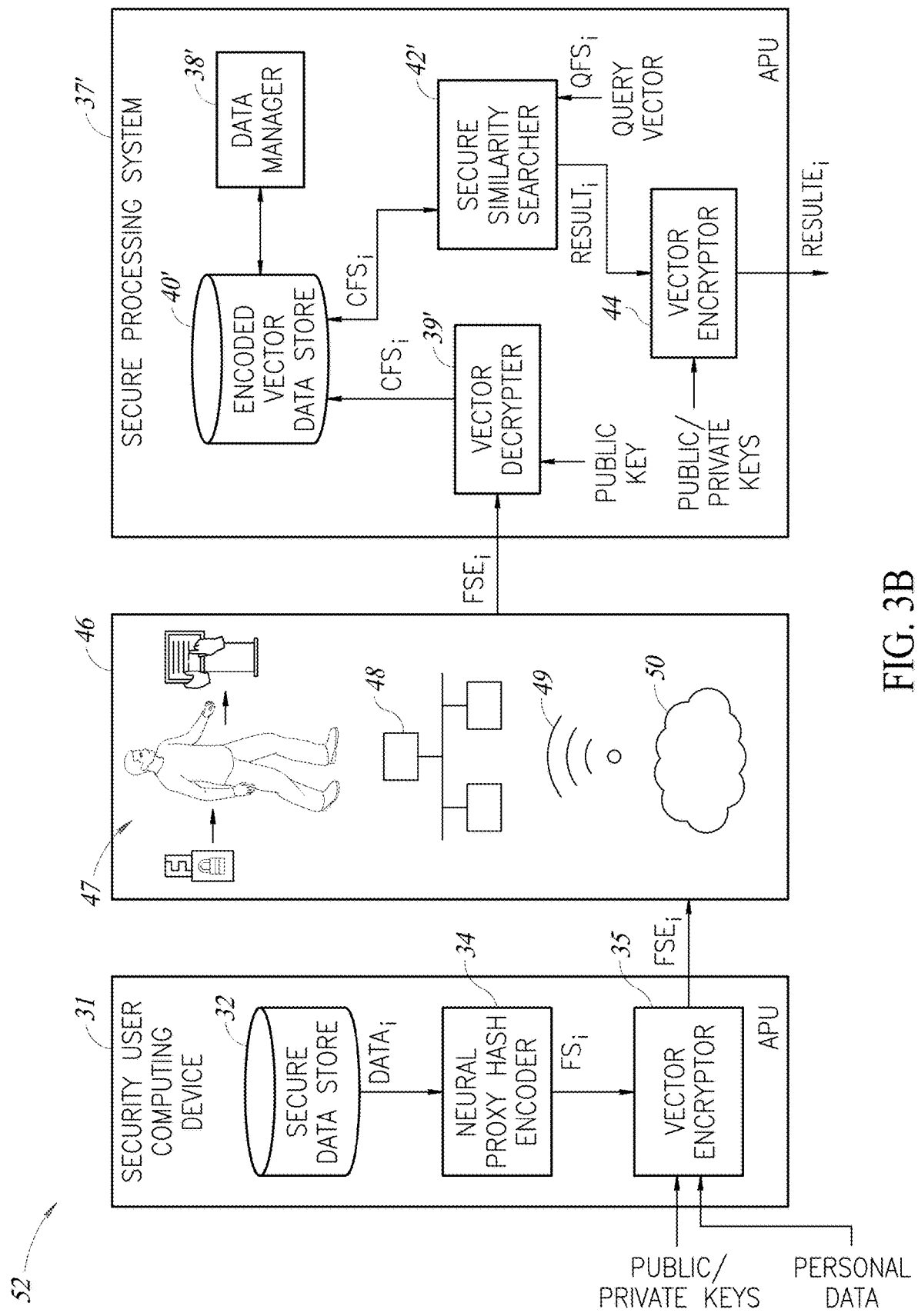
FIG. 3B is an illustration of the data flow in the encoded, encrypted, candidate vector system of FIG. 3A.

Reference is now made to FIG. 3A, which illustrates an encoded, encrypted, candidate vector system 52, and to FIG. 3B, which illustrates the data flow in system 52. Similarly to encoded, encrypted, search vector system 30, encoded, encrypted, candidate vector system 52 comprises secure user computing device 31 and a secure processing system 37', connected together across network 46.

Similarly, a secure data vector, $data_i$, which is unencoded and unencrypted raw data that is stored in data store 32, may be encoded into feature sets, $fs_i$, by neural proxy hash encoder 34. Encoded data vector $fs_i$ may then be encrypted into encoded and encrypted vector $fse_i$ by encryptor 35 using public and private keys of the sender and the public key of the receiver and adding any additional personal data such as name and age. Vector $fse_i$ may then be transmitted across network 46 to processing system 37'.

Secure processing system 37' comprises a data manager 38', a vector decryptor 39', an encoded vector data store 40', a secure similarity searcher 42', and a vector encryptor 44.

Encrypted NN encoded vector $fse_i$, such as those produced by secure user computing device 31, may be decrypted by vector decryptor 39'. In this embodiment, decryptor 39' may store the resulting NN encoded vector $fs_i$ as a candidate vector $cfs_i$ in encoded vector data store 40'. An encoded query vector $qfs_i$ may be input to secure similarity searcher 42' from either encoded vector data store 40' or as an external data input from a user. Secure similarity searcher 42' may then search for similar vectors among the candidate NN encoded vectors $cfs_i$ stored in columns of data store 40', including the newly added candidate vector $cfs_i$.

The results of the similarity search, $result_i$, may then be encrypted into an encrypted vector, $resulte_i$, by encryptor 44 before being stored or transmitted off the APU. Data manager 38' may then delete the newly added encoded candidate vector $cfs_i$, or may add it to data store 40' as a candidate vector $cfs_i$ for use in future searches.

Applicant has realized that just like an encrypted, encoded vector can be sent securely between a user and processing system, similarly unencoded vectors may also be sent securely and then encoded in the processing system.

Figure 4A:
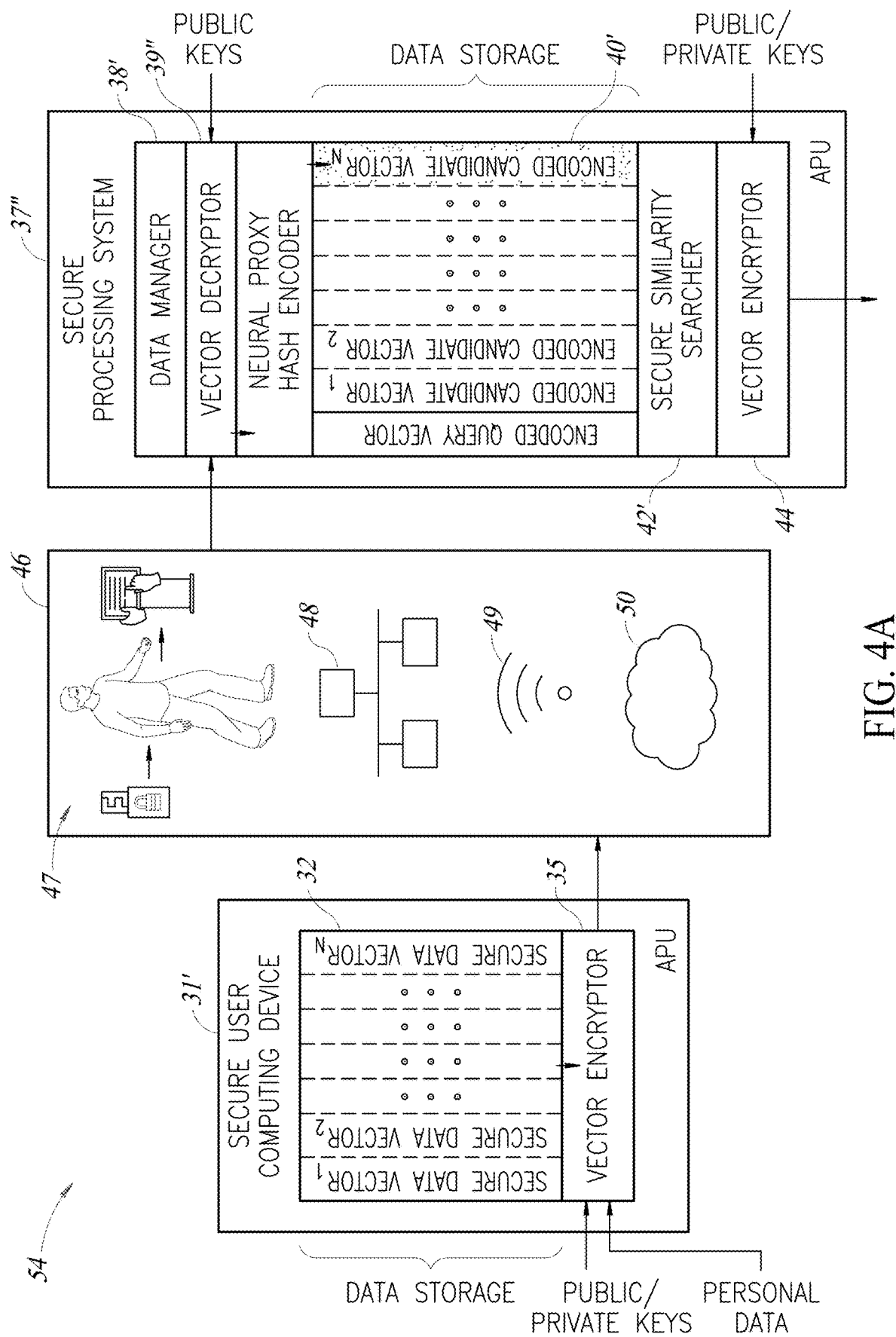
FIG. 4A is an illustration of an encrypted candidate vector system.
Figure 4B:
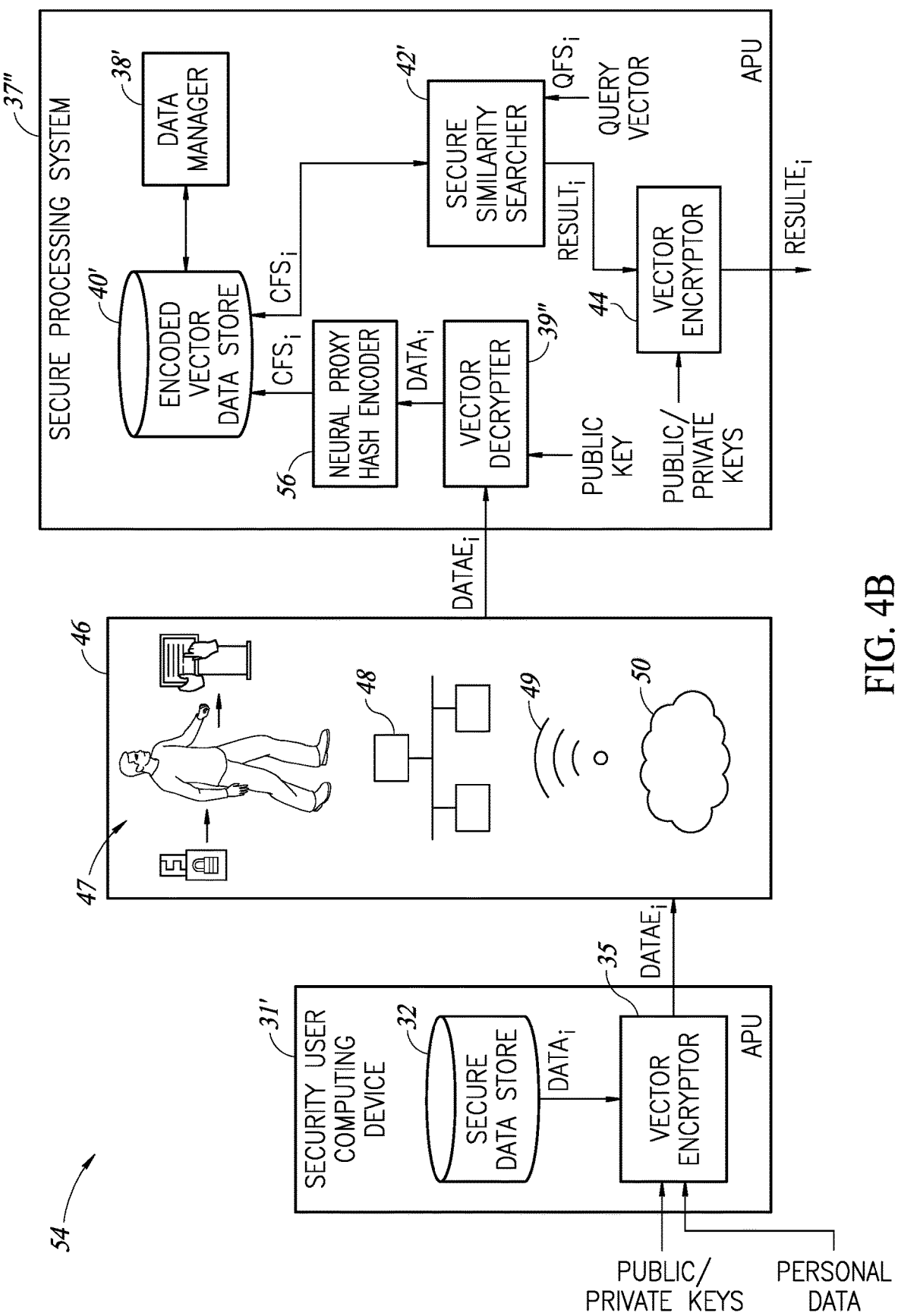
FIG. 4B is an illustration of the data flow in the encrypted candidate vector system of FIG. 4A.

Reference is now made to FIG. 4A, which illustrates an encrypted candidate vector system 54, and to FIG. 4B, which illustrates the data flow in system 54. Similarly to encoded, encrypted, candidate vector system 52, encrypted candidate vector system 54 comprises a secure user computing device 31' and a secure processing system 37", connected together across network 46.

Similarly, a secure data vector, $data_i$, which is unencoded and unencrypted raw data that is stored in data store 32, may be encrypted into encrypted vector, $datae_i$, by encryptor 35 using public and private keys of the sender and the public key of the receiver and adding any additional personal data such as name and age. Encrypted vector, $datae_i$ may then be transmitted across network 46 to processing system 37".

Secure processing system 37" comprises a data manager 38', a vector decryptor 39", a neural proxy hash encoder 56, an encoded vector data store 40', a secure similarity searcher 42', and a vector encryptor 44.

Encrypted data vector $datae_i$, such as those produced by secure user computing device 31', may be decrypted by vector decryptor 39". Decryptor 39" may then provide the resulting data vector data, to neural proxy hash encoder 56 to encode data vector data, into a binary encoded candidate vector $cfs_i$ and may store it in encoded vector data store 40' Similarly to system 52 in FIGS. 3A and 3B, an encoded query vector $qfs_i$ may be input to secure similarity searcher 42' from either encoded vector data store 40' or as an external data input, and may search for similar vectors among the candidate NN encoded vectors $cfs_i$ stored in columns of data store 40', including the newly added candidate vector $cfs_i$.

The results of the similarity search, $result_i$, may then be encrypted into encrypted vector, $resulte_i$, by encryptor 44, before being stored or transmitted off the APU. Data manager 38' may then delete the newly added encoded candidate vector $cfs_i$, or may add it to data store 40' as a candidate vector $cfs_i$ for use in future searches.

It should be noted that in another embodiment (not shown) of the preferred invention, neural proxy hash encoder 56 may encode data vector $data_i$ into a binary encoded search query vector $qfs_i$, that would be used as a query vector similarly to search vector $qfs_i$ in system 30 in FIGS. 2A and 2B.

Applicant has realized that just like unencoded vectors may also be sent securely and encoded in the processing system, similarly unencoded vectors may be sent securely and saved in the processing system, without being NN encoded.

Figure 5A:
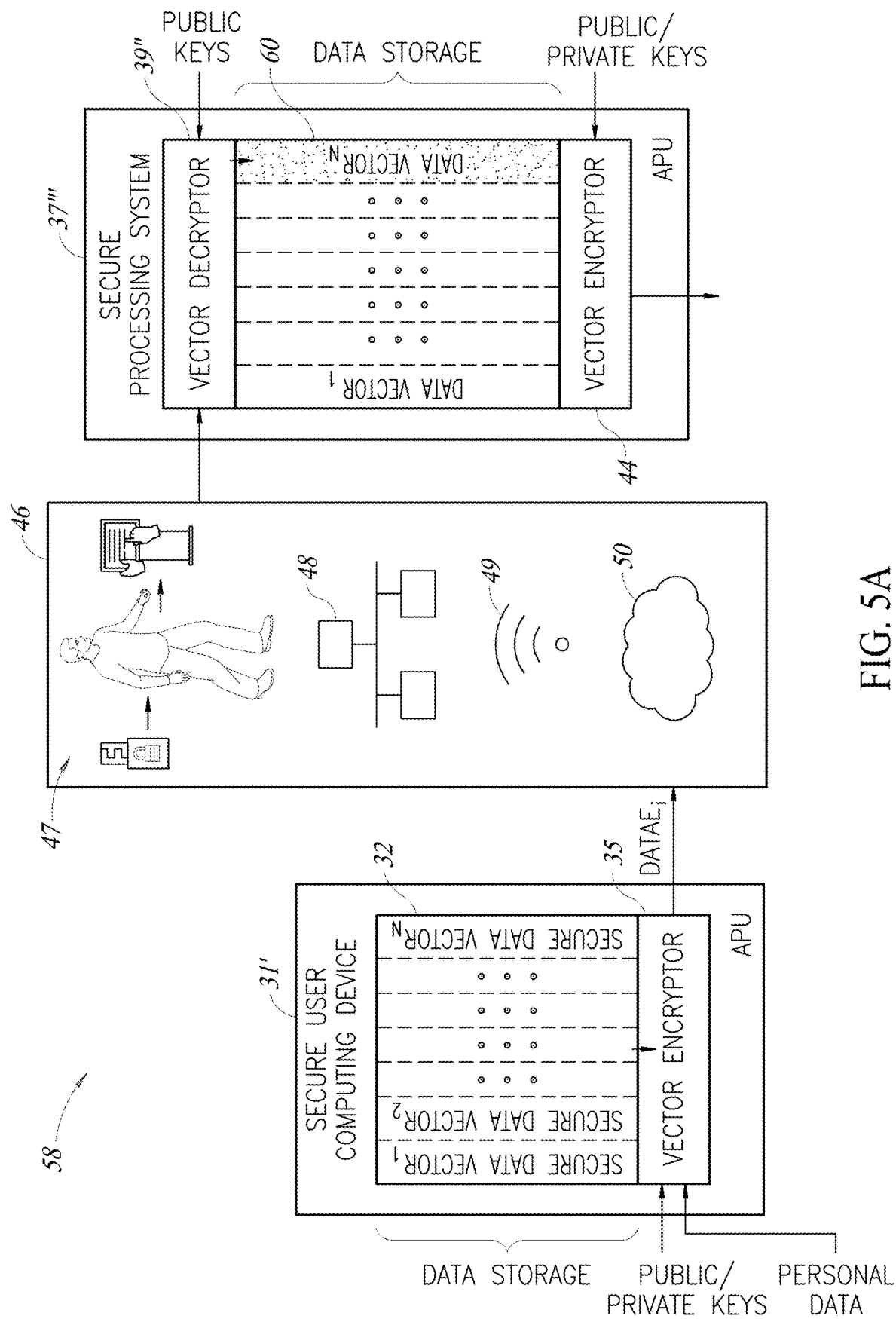
FIG. 5A is an illustration of a vector transfer system.
Figure 5B:
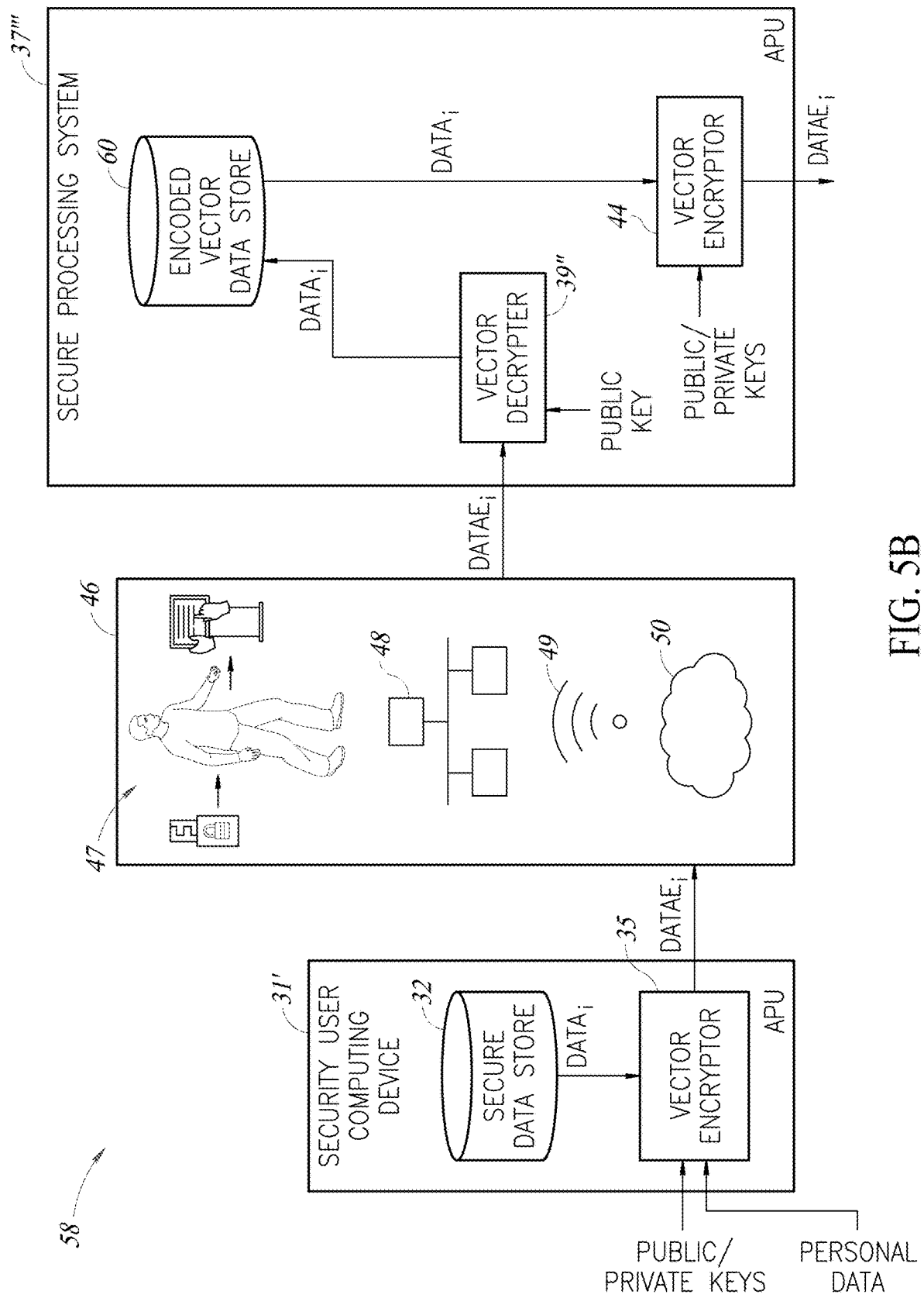
FIG. 5B is an illustration of the data flow in a vector transfer system of FIG. 5A.

Reference is now made to FIG. 5A which illustrates a vector transfer system 58, and to FIG. 5B which illustrates the data flow in system 58. Similarly to encrypted candidate vector system 54, vector transfer system 58 comprises a secure user computing device 31' and a secure processing system 37''', connected together across network 46.

A secure data vector, $data_i$, which is unencoded and unencrypted raw data that is stored in data store 32, may be encrypted into encrypted vector $datae_i$, by encryptor 35, using public and private keys of the sender and the public key of the receiver and adding any additional personal data such as name and age. Encrypted vector, $datae_i$, may then be transmitted across network 46 to processing system 37'''.

Secure processing system 37''' comprises a vector decryptor 39''', a data vector store 60, and a vector encryptor 44.

Encrypted data vector $datae_i$, such as those produced by secure user computing device 31', may be decrypted by vector decryptor 39''' into data vector $data_i$. Decryptor 39''' may then store data, in vector data store 60.

Data vector, $data_i$, from vector data store 60 may then be encrypted into encrypted data vector $datae_i$ by vector encryptor 44, before being stored or transmitted off the APU.

It should be noted that by processing encryption and encryption on-chip APU encryption protects the private and public keys from sniffers. It will be appreciated that even raw data that is encrypted using on-chip APU encryption methods is more secure than that encrypted using current system-based encryption processes.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A system comprising:
    a secure in-memory unit implemented on an associative processing unit (APU), said APU implemented in a memory array having columns, for creating encrypted vectors for secure data transfer to an external similarity searcher, said unit to implement:
        an in-memory secure data store to store raw data to be kept secure in said columns;
        an in-memory neural proxy hash encoder comprising a trained neural network trained to encode data into binary encoded feature sets having a non-recoverable representation of said raw data, said encoder operative in user-selected ones of said columns to encode user selected ones of said raw data into a binary encoded feature set stored in portions of said columns; and
        an in-memory encryptor operative in said portions of said columns to encrypt said binary encoded feature set into an encrypted vector for said secure data transfer.

2. The system of claim 1 said trained neural network to encode at least one of: image files, audio files, and large data sets.

3. The system of claim 1 wherein said APU is implemented on one of: SRAM, non-volatile, and non-destructive memory.

4. A system comprising:
    a secure, in-memory unit implemented on an associative processing unit (APU), said APU implemented in a memory array having columns, for securely receiving and decrypting data to be kept secure during a similarity search, said unit to implement:
        an in-memory decryptor to decrypt a received encrypted data vector into a secure encoded data vector formed of a binary encoded feature set generated by an external neural proxy hash encoder, wherein said encoded feature set is a non-recoverable representation of user selected raw data to be kept secure; and
        an in-memory encoded vector data store to store said secure encoded data vector in said columns among a plurality of previously decrypted secure encoded data vectors, said secure encoded vector to act as a query vector to said similarity search through said previously decrypted secure encoded data vectors.

5. The system of claim 4 wherein said APU is implemented on one of: SRAM, non-volatile, and non-destructive memory.

\* \* \* \* \*